(12) United States Patent
Pemble

(10) Patent No.: US 6,392,593 B1
(45) Date of Patent: May 21, 2002

(54) TIME DIVISION SATELLITE ACQUISITION

(75) Inventor: Cliff Pemble, Olathe, KS (US)

(73) Assignee: Garmin Corporation (TW)

(*) Notice: Subject to any disclaimer, the term of this patent is extended or adjusted under 35 U.S.C. 154(b) by 0 days.

(21) Appl. No.: 09/566,896

(22) Filed: May 8, 2000

(51) Int. Cl.[7] .............................................. H04B 7/185
(52) U.S. Cl. ................................................ 342/357.15
(58) Field of Search ....................... 342/357.06, 357.13, 342/357.15; 701/213; 455/12.1

(56) References Cited

U.S. PATENT DOCUMENTS

| | | | |
|---|---|---|---|
| 5,185,610 A | * 2/1993 | Ward et al. ................ | 342/357 |
| 5,203,030 A | * 4/1993 | Kawasaki ................ | 455/164.2 |
| 5,373,531 A | 12/1994 | Kawasaki .................... | 375/1 |
| 5,402,347 A | 3/1995 | McBurney et al. ......... | 364/443 |
| 5,808,581 A | * 9/1998 | Braisted et al. ............ | 342/357 |
| 6,121,923 A | * 9/2000 | King ..................... | 342/357.12 |
| 6,133,874 A | * 10/2000 | Krasner ................. | 342/357.15 |

\* cited by examiner

*Primary Examiner*—Dao Phan
(74) *Attorney, Agent, or Firm*—Devon A. Rolf

(57) ABSTRACT

A GPS system device acquires satellites after a power-on event without requiring a need for a real time clock. A list of the highest visible satellites for a given periodic interval is computed and referenced by time. The list can be stored in a non-volatile or battery backed memory during a power off state or can be generated at power up prior to satellite acquisition. When the GPS system device is powered on, satellites from the list are searched using a multi-channel correlator until at least one of the satellites is acquired. The present time is estimated based upon the relationship to the list of the satellite, and satellite visibility is computed. The multi-channel correlator is then updated to search satellites that are likely to be visible based upon the acquired satellite. The search for satellites is further refined by the observation of the handover word provided by an acquired satellite. When a minimum number of satellites are acquired, normal satellite tracking and position computation may occur.

30 Claims, 4 Drawing Sheets

TIME DIVISION SATELLITE ACQUISITION

BACKGROUND

The present invention relates generally to satellite navigation and more specifically to satellite acquisition and tracking systems.

Modem Global Positioning System (GPS) receivers typically include a real time clock that is used to estimate visible satellites upon acquisition. The GPS system by nature provides time information to the user after satellite acquisition occurs. When a GPS system device is powered down, a battery backed real time clock maintains a time reference such that the position of satellites may be readily determined when the GPS system device is subsequently powered on. This determination is based upon previously stored position data of the system and almanac data of the satellites along with the time reference provided by the real time clock. However, an accurate real time clock provides increased expense to a GPS system device. As the cost of consumer grade GPS receivers continues to fall, methods and techniques to reduce the cost are becoming increasingly important to compete in the marketplace. As a result, it is desirable to be able to eliminate any need for a real time clock in a GPS system device and at the same time minimize impact on satellite acquisition times.

SUMMARY OF THE INVENTION

The present invention eliminates the need for a real time clock as a component of a GPS system device or the like. The need for a real time clock is obviated by utilizing information related to satellite positions over predetermined time intervals spanning the orbital period of the space vehicles. When the GPS system device is powered on, the GPS system device assumes that the position of the system is nearby the last computed and stored position when power was last removed. The time uncertainty is solved using knowledge of the satellite constellation over the orbital period. The GPS system device pre-computes the highest satellite visible for each predetermined interval, for example a period of 2 hours, during the course of an orbital period at the present position of the GPS system device. In the case of the GPS Navstar system, completion of an approximate 12 hour orbital period at 2-hour intervals results in a list of 6 satellites. When the receiver is powered on, each channel of a parallel channel receiver is assigned one of the satellites from the pre-computed list of satellites. When one of the satellites is acquired, time uncertainty is eliminated or reduced, in part by knowing which satellite is acquired versus its relationship to the list. Once a satellite signal is acquired, the handover word in the navigation data stream allows the receiver to recompute an actual list of visible satellites after which normal acquisition can commence. Satellites that are not visible are removed from the acquisition list and replaced by those that are visible.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
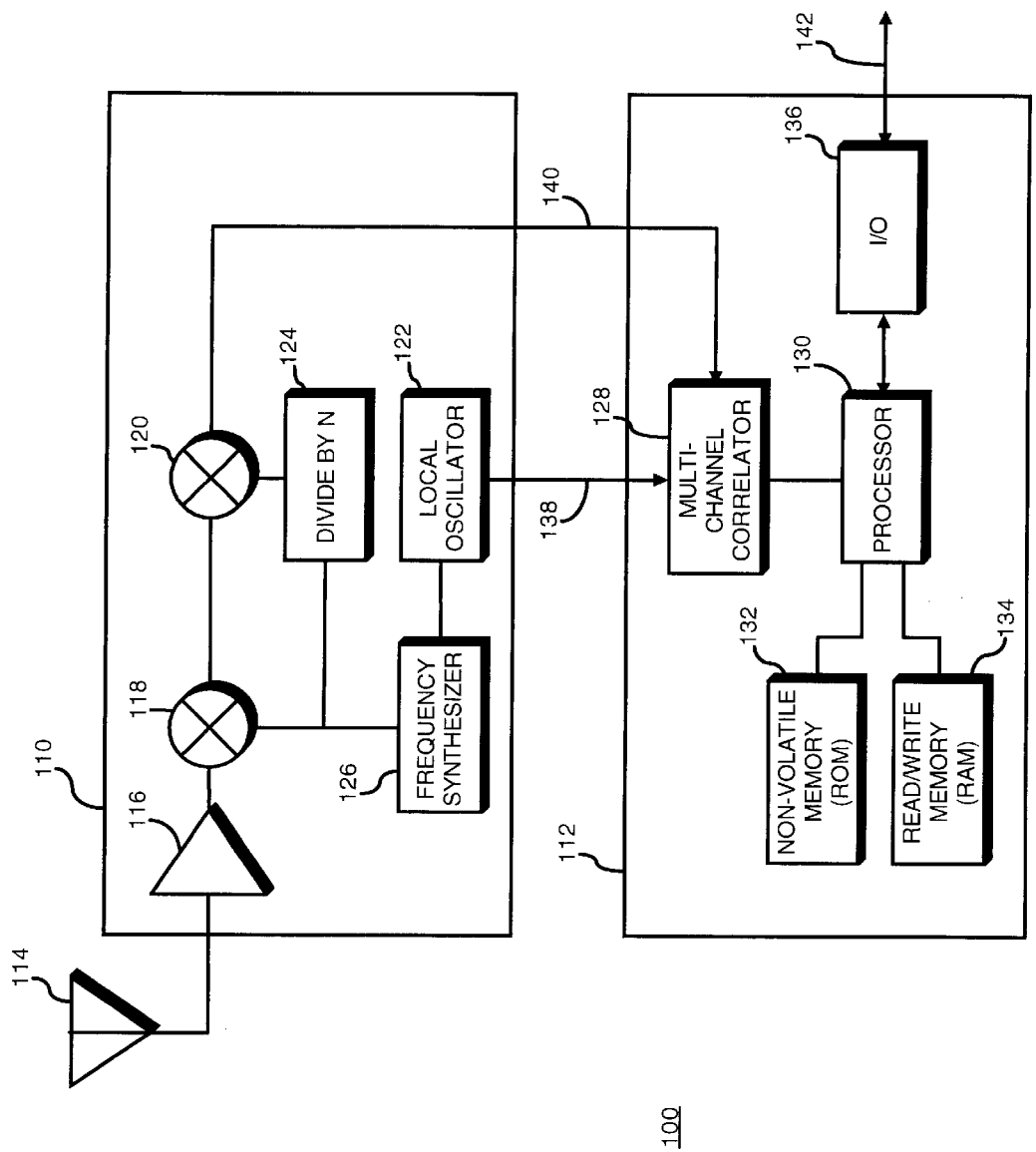
FIG. 1 is a block diagram of a GPS system device operable to tangibly embody the present invention.

Referring now to FIG. 1, a block diagram of a Global Positioning System (GPS) receiver and processing system in accordance with the present invention will be discussed. GPS system device 100 includes a GPS receiver 110 and navigation computer 112. Antenna 114 of GPS receiver 110 receives a GPS signal transmitted substantially simultaneously from one or more satellites in a constellation of satellites in orbit about the earth. Antenna 114 may also receive other GPS or GPS like signals transmitted from other sources such as the Wide Area Augmentation System (WAAS) operated by the Federal Aviation Administration. The received signals are amplified by amplifier 116 which in one embodiment is a low noise amplifier having a gain A. The signals are passed through cascade-connected mixers 118 and 120, respectively. The signal is then down converted using divide by N block 124, frequency synthesizer 126, and local oscillator 122, and presented to a multi-channel correlator 128 via line 140 that is capable of correlating the received GPS signals with one or more known pseudo-random noise (PRN) signals for detecting a valid GPS signal received at antenna 114. Local oscillator 122 also provides a clock output 138 to multi-channel correlator 128. In the Navstar system for example, a coarse acquisition (C/A) code modulated in a transmitted GPS signal may be detected. Ephemeris and almanac information is provided from an acquired satellite via the GPS signal.

Navigation computer 112 includes a processor 130 coupled to multi-channel correlator 130 for controlling the correlator operation. A program of instructions executed by processor 130 may be stored as firmware in a non-volatile, generally read-only memory (ROM) 132 which may include, for example, FLASH memory, electrically erasable programmable read-only memory (EEPROM memory), or battery backed static random-access memory (SRAM) or dynamically refreshable random-access memory (DRAM). Non-volatile memory 132 may also include other information storage media such as magnetic storage media including but not limited to a hard disk drive or floppy disk drive. The program of instructions may be loaded into read/write memory (RAM) 134 for execution and implementation by processor 130. Read/write memory 134 may include refreshable memory such as DRAM or may include non-refreshed memory such as SRAM and may be provided with backup power so that the states of read/write memory 134 are retained when GPS system device 100 is not powered on. Navigation computer 112 also includes an input/output (I/O) system 136 for receiving data from or providing data to auxiliary devices via communication line 142, for example a keypad or a display. In accordance with the present invention, GPS system device 100 obviates the need for a real time clock for tracking time when GPS system device 100 is powered off and then acquires satellites when GPS system device 100 is subsequently powered on. As should be apparent to one having skill in the art, GPS system device 100 may be modified or provided with more or fewer elements than shown in FIG. 1 without providing substantial change to the function or operation of GPS system device 100 or to the scope of the present invention.

Figure 2:
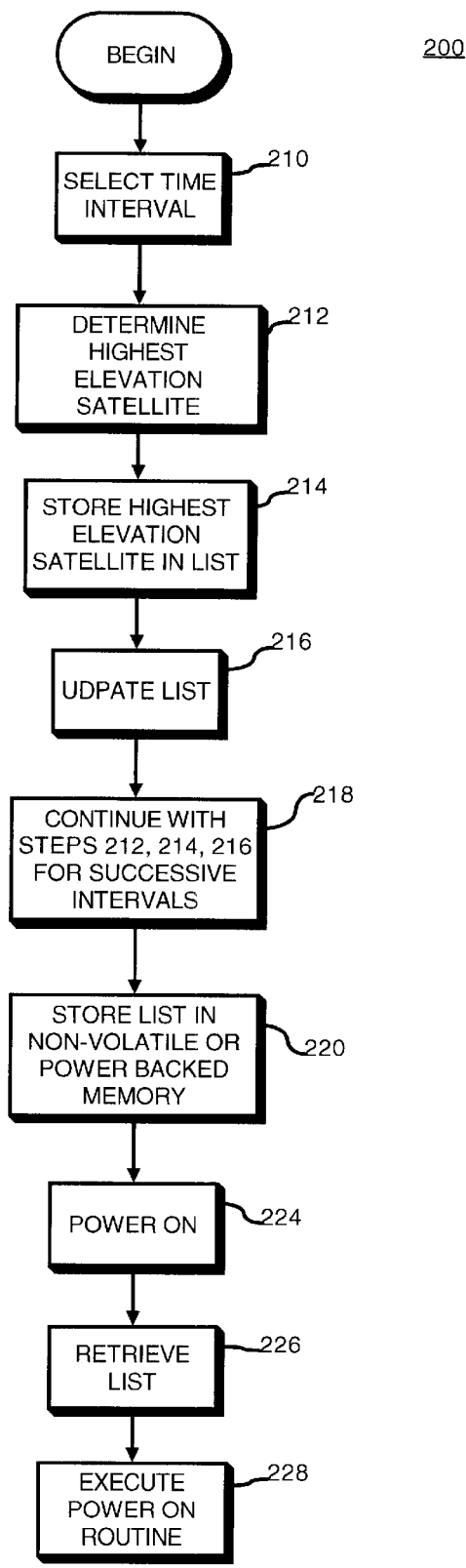
FIG. 2 is a flow diagram of a method for implementing a list of satellites having the highest elevation at predetermined time intervals in accordance with the present invention.

Referring now to FIG. 2, a method for obtaining a list of satellites having the highest elevation in a predetermined time interval in accordance with the present invention will be discussed. Although FIG. 2 shows an example of one embodiment of the present invention, the invention is not limited to the order or number of steps shown such that the order of the steps may be altered and fewer steps or more steps may be executed without providing substantial change to the scope of the invention. As shown in FIG. 2, method 200 begins while GPS system device 100 is operating. A predetermined time interval is selected at step 210 for which a list of acquired and tracked satellites having the highest elevation during a selected one of the predetermined successive time intervals. For example, the predetermined time interval may be selected to be two hours at which time, periodically, the highest satellite visibility computation takes place. The predetermined time interval can be a hard coded value determined at the compile time of the firmware stored in non-volatile memory 132 or alternatively could be computed dynamically at run-time when processor 130 executes the firmware. GPS system device 100 computes the position of each satellite for each time interval and notes which satellite in the constellation of GPS satellites is at the highest elevation within each successive interval as executed at step 212. The highest elevation satellite identified at step 212 for each predetermined interval is stored in a list at step 214 where the identification of the highest satellite is indexed in the list with the time of the corresponding predetermined interval. The highest elevation satellite is calculated with respect to the present position of GPS system device 100 using almanac information or available ephemeris information provided by each of the tracked satellites. The length of such a list may span a predetermined length of time, for example the orbital period of the GPS satellites. An example of a list, in accordance with the present invention, of the highest visible satellite at successive predetermined intervals indexed by time is shown in Table 1.1, below. After the highest elevation satellite is found for a given interval, the list is updated at step 216 and the loop continues for additional intervals by continuously executing steps 212, 214, and 216 so that the list of highest satellites is maintained and updated for successive intervals. At the end of the intervals the process is reset so that the list of satellites can be continuously updated as the position of the user, and that of GPS system device 100, changes. In the event GPS system device 100 is to be powered down, the list is stored in non-volatile memory 132 at step 220 or alternatively in a battery backed up volatile memory. At a subsequent power on event occurring at step 224, the list may be retrieved from memory at step 226, and a power on routine in accordance with the present invention is executed at step 228. The power on routine executed at step 228 is discussed in further detail with respect to FIG. 3.

TABLE 1.1

List of Highest Satellite in Predetermined Time Interval

| Interval | Time | Satellite |
| --- | --- | --- |
| 1 | 12:00 a.m. | 21 |
| 2 | 2:00 a.m. | 17 |
| 3 | 4:00 a.m. | 11 |
| 4 | 6:00 a.m. | 22 |

TABLE 1.1-continued

List of Highest Satellite in Predetermined Time Interval

| Interval | Time | Satellite |
| --- | --- | --- |
| 5 | 8:00 a.m. | 4 |
| 6 | 10:00 a.m. | 13 |

Figure 3:
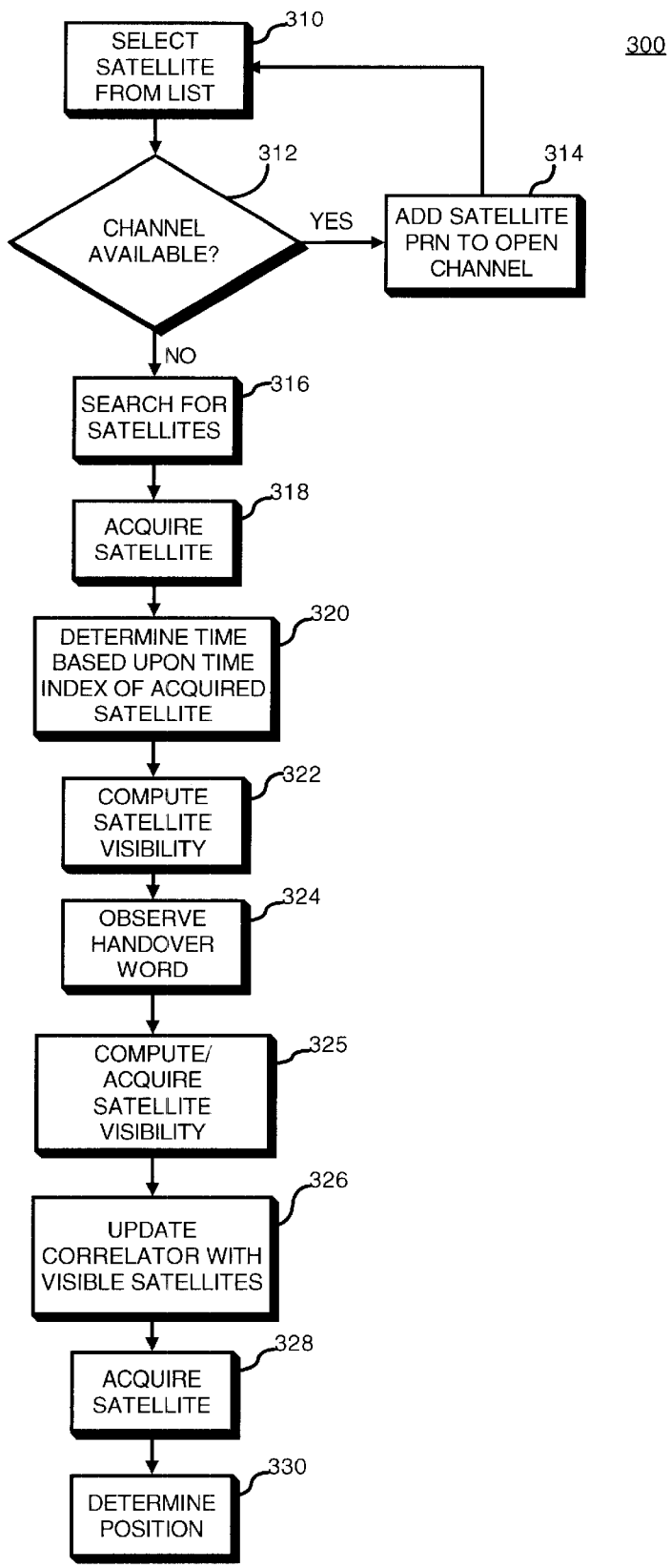
FIG. 3 is a flow diagram of a method for determining present time without requiring a real time clock in accordance with the present invention by using the list generated in the method depicted in FIG. 2.

Referring now to FIG. 3, a flow diagram of a method for acquiring GPS satellites without the need for a real time clock will be discussed. Although FIG. 3 shows an example of one embodiment of the present invention, the invention is not limited to the order of number of steps shown such that the order of the steps may be altered and fewer steps or more steps may be executed without providing substantial change to the scope of the invention. Method 300 is initiated at a power on event 224 of GPS system device 100 upon the execution of steps 228 of method 200 discussed with respect to FIG. 2. A satellite is selected at step 310 from the list of highest visible satellites, generated by method 200. A determination is made at step 312 whether there is an available channel in correlator 128 with which to acquire the selected satellite. In the event one or more channels are available, the pseudo-random number (PRN) corresponding to the satellite selected at step 314 is provided to correlator 128 so that acquisition of the satellite may occur. This process repeats for other satellites in the list until all available channels are utilized for satellite acquisition. GPS system device 100 searches for the satellites from the list at step 316 until at least one of the satellites is acquired at step 318. When at least one satellite is acquired, GPS system device 100 determines at step 320 an estimate of the present time based upon the time indexed in the list that corresponds to the acquired satellite. Present satellite visibility is computed at step 322 to narrow the possible visible satellites based upon the satellite acquired at step 318 so that subsequent satellite acquisition is optimized. The handover word transmitted from at least one or more acquired satellites is observed at step 324. The handover word, the word in the GPS signal message that contains synchronization information for tracking satellites from the C/A-code to the precision (P)-code, is used to refine the search criteria for remaining visible satellites. Satellite visibility based on the handover word from an acquired satellite is computed at step 325. Correlator 128 is updated at step 326 wherein satellites that are determined not to be visible, as determined at steps 322 and 324, are removed from the channels of correlator 128, and satellites likely to be visible are added to the opened channels so that satellites that are likely to be visible are acquired at step 328. The position of GPS device 110 is determined at step 330. The process continues until a sufficient number of satellites is acquired so that regular tracking may occur. It should be noted that methods 200 and 300 depicted in FIGS. 2 and 3, respectively, need not be limited to the order shown such that the orders of the steps may be reconfigured, and that fewer or greater steps may be implemented, without providing substantial change to the scope of the method, to the scope of the corresponding claims, or the scope of the invention. Furthermore, although for example purposes methods 200 and 300 are discussed with respect to the highest acquired satellite in a GPS constellation of satellites, one having skill in the art would appreciate after having the benefit and hindsight of the present disclosure that methods 200 and 300 could be modified, for example to include signals acquired from other space or flight vehicles in lieu of satellites, to generate a list based upon other criteria, for example the lowest acquired satellite rather than the highest acquired satellite in a predetermined interval, or from other GPS signal sources such as from the Wide Area Augmentation System (WAAS) of the Federal Aviation Administration or any device that is capable of transmitting a pseudolite GPS signal, without providing substantial change to the scope of methods 200 or 300, to the scope of the corresponding claims, or to the scope of the invention. Receivers and processing systems in accordance with the present invention may be constructed to operate with any Global Positioning System (GPS) such as the Navstar GPS operated by the U.S. Government and which provides both military and civilian signals, the Glonass GPS system operated by the Russian Federation government, or the Galileo GPS system to be implemented by the European Union.

Figure 4:
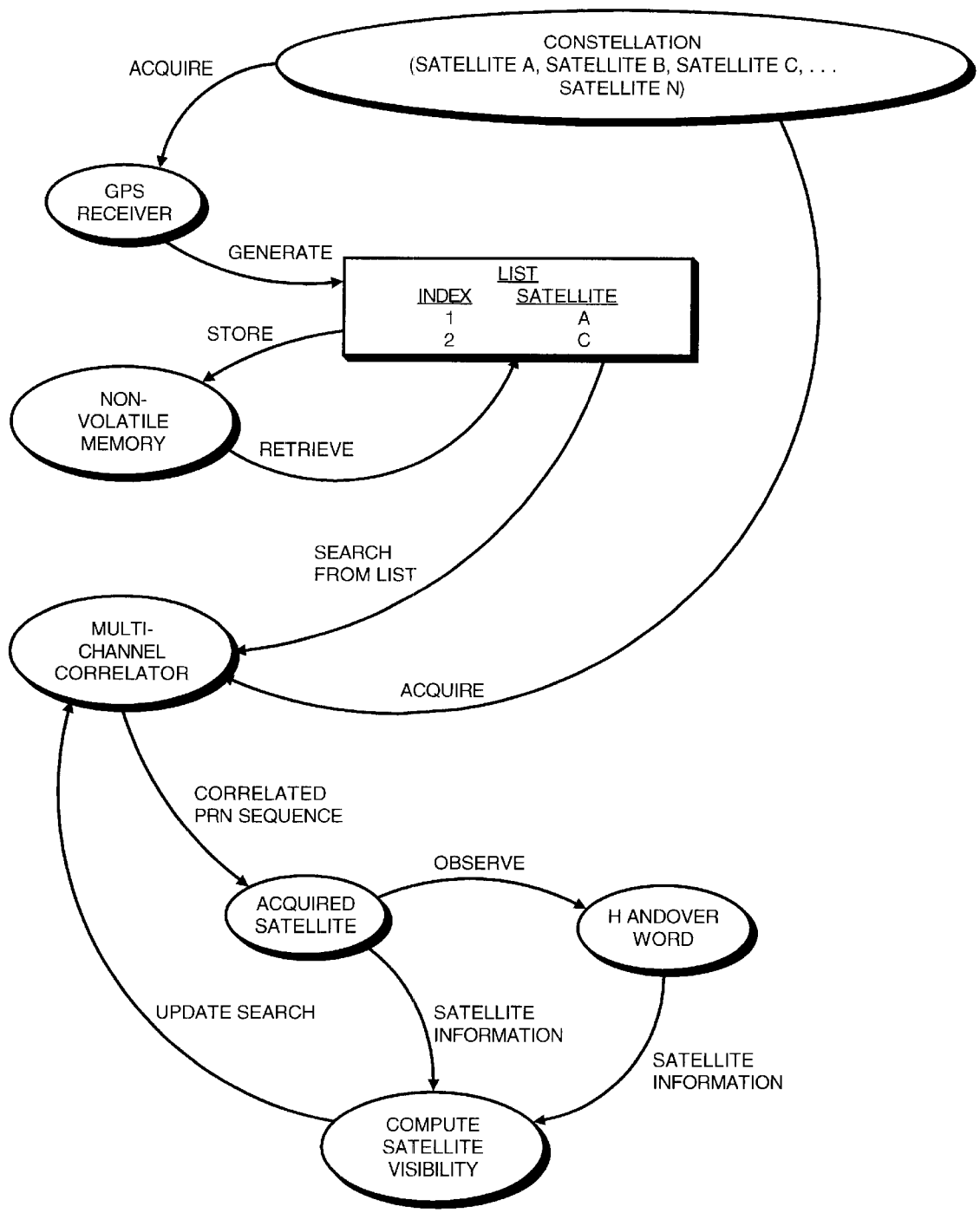
FIG. 4 is a diagram of the overall operation of the invention.

Referring now to FIG. 4, a diagram of the overall operation of the invention is shown. A constellation of satellites, or space vehicles, includes one or more satellites each transmitting a unique GPS signal. The signals are acquired by GPS receiver 110 that determines which satellites in the constellation are highest at successive predetermined intervals. The order of the satellites in the list defines a time relationship based on the period of orbits of the satellites. Thus, the present time can be inferred by acquiring satellites so that satellites that are presently visible can be identified. Based on which satellites in the list are presently visible, the present time can be approximated from the time relationship of the satellites in the list. The list is stored in a non-volatile memory so that information in the list may be retained when GPS device 100 is powered down and then later retrieved. When the present time is unknown, such as after a period during which GPS device 100 is powered down and not tracking satellites, multi-channel correlator 128 searches for satellites that are stored in the list. When multi-channel correlator acquires one or more of the satellites in the list via correlation of a PRN sequence of a satellite in the list, present satellite visibility is known and the present time can be inferred based upon the time relationship of the visible satellites in the list. When a satellite is acquired, satellite visibility can be better computed so that multi-channel correlator 128 can be updated with the PRN sequences of satellites that are expected to be visible. Also, the handover word from an acquired satellite can be observed so that present satellite visibility can be updated at multi-channel correlator 128. The process reiterates until an accurate time reference and the present position of GPS device 100 can be determined.

It is believed that the method and apparatus for time division satellite acquisition of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:

determining a higher one of at least one or more satellites during at least one or more predetermined intervals;

generating a list containing information on the higher one of the at least one or more satellites for each of the at least one or more predetermined intervals;

searching for at least one or more of the satellites in the list until at least one or more of the satellites in the list is acquired; and upon acquiring at least one or more satellites in the list, determining the present time based on the information contained in the list without use of a real-time clock.

2. A method as claimed in claim 1, further comprising the step of determining the present time based on information provided by at least one of the acquired satellites.

3. A method as claimed in claim 1, the information contained in the list including an ordered relationship of satellites stored in the list from which the present time may be determined in said determining step based upon the ordered relationship of at least one or more acquired satellites in the list.

4. A method as claimed in claim 1, said searching step including searching for two or more of the satellites in the list simultaneously.

5. A method as claimed in claim 1, further comprising the step of searching for at least one or more presently visible satellites determined in said determining step.

6. A method as claimed in claim 1, further comprising the step of storing the list in a memory during a power off condition.

7. A method as claimed in claim 1, said determining and said generating steps being executed upon a power up event.

8. A method, comprising:

determining a higher one of at least one or more satellites during at least one or more predetermined intervals;

generating a list containing information on the higher one of the at least one or more satellites for each of the at least one or more predetermined intervals;

searching for at least one or more of the satellites in the list until at least one or more of the satellites in the list is acquired;

upon acquiring at least one or more satellites in the list, determining the present time based on the information contained in the list; and observing a handover word from an acquired at least one or more satellites in the list, computing present satellite visibility based upon the handover word, and searching for at least one or more presently visible satellites computed in said computing step.

9. A method as claimed in claim 1, the at least one or more predetermined intervals spanning a period of orbit of the at least one or more satellites.

10. An apparatus, comprising:

means for determining a higher one of at least one or more satellites during at least one or more predetermined intervals;

means for generating a list containing information on the higher one of the at least one or more satellites for each of the at least one or more predetermined intervals;

means for searching for at least one or more of the satellites in the list until at least one more of the satellites in the list is acquired; and upon acquiring at least one or more satellites in the list, means for determining the present time based on the information contained in the list without use of a real-time clock.

11. An apparatus as claimed in claim 10, said present time determining means being capable of determining the present time based on information provided by at least one of the acquired satellites.

12. An apparatus as claimed in claim 10, the information contained in the list including an ordered relationship of satellites stored in the list from which the present time may be determined by said present time determining means based upon the ordered relationship of at least one or more acquired satellites in the list.

13. An apparatus as claimed in claim 10, said searching means being capable of searching for two or more of the satellites in the list simultaneously.

14. An apparatus as claimed in claim 10, said searching means being capable of searching for at least one or more presently visible satellites based upon the present time determined by said present time determining, means.

15. An apparatus as claimed in claim 10, further comprising means for storing the list during a power off condition.

16. An apparatus as claimed in claim 10, said higher one determining means and said generating means being activated upon a power up event.

17. An apparatus, comprising:

means for determining a higher one of at least one or more satellites during at least one or more predetermined intervals;

means for generating a list containing information on the higher one of the at least one or more satellites for each of the at least one or more predetermined intervals;

means for searching for at least one or more of the satellites in the list until at least one or more of the satellites in the list is acquired;

upon acquiring at least one or more satellites in the list, means for determining the present time based on the information contained in the list; and means for observing a handover word from an acquired at least one or more satellites in the list, means for computing present satellite visibility based upon the handover word, said searching means being capable of searching for at least one or more presently visible satellites computed by said present satellite visibility computing means.

18. An apparatus as claimed in claim 10, the at least one or more predetermined intervals spanning a period of orbit of the at least one or more satellites.

19. A computer program product, capable of being read by a machine, for causing a machine to implement steps for acquiring satellites in a GPS system without the need for a real time clock, the steps comprising:

determining a higher one of at least one or more satellites during at least one or more predetermined intervals;

generating a list containing information on the higher one of the at least one or more satellites for each of the at least one or more predetermined intervals;

searching for at least one or more of the satellites in the list until at least one or more of the satellites in the list is acquired; and upon acquiring at least one or more satellites in the list, determining the present time based on the information contained in the list without use of a real-time clock.

20. A computer program product as claimed in claim 19, the steps further comprising the step of determining the present time based on information provided by at least one of the acquired satellites.

21. A computer program product as claimed in claim 19, the information contained in the list including an ordered relationship of satellites stored in the list from which the present time may be determined in said determining step based upon the ordered relationship of at least one or more acquired satellites in the list.

22. A computer program product as claimed in claim 19, said searching step including searching for two or more of the satellites in the list simultaneously.

23. A computer program product as claimed in claim 19, the steps further comprising the step of searching for at least one or more presently visible satellites computed in said computing step.

24. A computer program product as claimed in claim 19, the steps further comprising the step of storing the list in a memory during a power off condition.

25. A computer program product as claimed in claim 19, said determining and said generating steps being executed upon a power up event.

26. A computer program product, capable of being read by a machine, for causing a machine to implement steps for acquiring satellites in a GPS system without the need for a real time clock, the steps comprising:

determining a higher one of at least one or more satellites during at least one or more predetermined intervals;

generating a list containing information on the higher one of the at least one or more satellites for each of the at least one or more predetermined intervals;

searching for at least one or more of the satellites in the list until at least one or more of the satellites in the list is acquired;

upon acquiring at least one or more satellites in the list, determining the present time based on the information contained in the list; and observing a handover word from an acquired at least one or more satellites in the list, computing present satellite visibility based upon the handover word, and searching for at least one or more presently visible satellites computed in said computing step.

27. A computer program product as claimed in claim 19, the at least one or more predetermined intervals spanning a period of orbit of the at least one or more satellites.

28. A method of determining a present time in a GPS receiver, the method comprising the steps of:

determining for a plurality of predetermined time intervals a highest elevation satellite for each of the predetermined time intervals;

generating a list containing information on each of the highest elevation satellites for each of the predetermined time intervals, when the GPS receiver is powered-on, searching for at least one of the highest elevation satellites in the list until a satellite signal is acquired therefrom; and upon acquiring the satellite signal, determining the present time of the GPS receiver based on the information in the list without use of a real-time clock.

29. A method as claimed in claim 28, further comprising the step of determining the present time based on information provided by at least one of the acquired satellites.

30. A method as claimed in claim 28, the information contained in the list including an ordered relationship of satellites stored in the list from which the present time may be determined in said determining step based upon the ordered relationship of at least one or more acquired satellites in the list.

* * * * *